United States Patent [19]

Boulanger et al.

[11] Patent Number: 5,352,504
[45] Date of Patent: Oct. 4, 1994

[54] ELECTROCHROMIC GLAZING

[75] Inventors: Frank Boulanger, Ville d'Avray; Francois Lerbet, Paris; Corinne Papret, Evry; Franck Perrodo, Paris; Gilles Thomas, Gif sur Yvette, all of France

[73] Assignee: Saint-Gobain Vitrage International, Courbevoie, France

[21] Appl. No.: 790,722

[22] Filed: Nov. 8, 1991

[30] Foreign Application Priority Data

Nov. 14, 1990 [FR] France .................. 90 14134
Jun. 27, 1991 [FR] France .................. 90 07932

[51] Int. Cl.$^5$ .................. G02F 1/15; C03C 27/06
[52] U.S. Cl. .................. 428/216; 359/265; 359/272; 359/273; 359/274; 359/275; 428/1; 428/336; 428/210; 428/209; 428/432; 428/697; 428/699; 428/701; 428/702
[58] Field of Search .............. 428/336, 697, 699, 701, 428/702, 432, 216, 704, 209, 210; 359/272, 273, 274, 275, 265

[56] References Cited

U.S. PATENT DOCUMENTS

| | | | |
|---|---|---|---|
| 4,182,551 | 1/1980 | Washida et al. | 350/357 |
| 4,220,514 | 9/1980 | Duchene et al. | 204/192 |
| 4,240,713 | 12/1980 | Leibowitz | 350/357 |
| 4,309,083 | 1/1982 | Duchene et al. | 350/357 |
| 4,830,471 | 5/1989 | Demiryont | 350/357 |

FOREIGN PATENT DOCUMENTS

| | | |
|---|---|---|
| 0253713A1 | 7/1987 | European Pat. Off. . |
| 0338876A1 | 3/1989 | European Pat. Off. . |
| 0373020A1 | 11/1989 | European Pat. Off. . |
| 57-100414 | 6/1982 | Japan . |
| 61-227946 | 11/1986 | Japan . |

OTHER PUBLICATIONS

Stuart F. Cogan and R. David Rauh, "The a-WO$_3$-/a-IrO$_2$ Electrochromic System," Large-Area Chromogenics: Materials and Devices for Transmittance Control, pp. 482–493, vol. IS 4, Sep. 1988.

Primary Examiner—A. A. Turner
Attorney, Agent, or Firm—Pennie & Edmonds

[57] ABSTRACT

The invention relates to an electrochromic glazing successively comprising a glass sheet, a first electrode constituted by a transparent electroconductive layer, whose square resistance is below 5 Ohms, a layer of a cathodic electrochromic material, an electrolyte, a layer of an anodic electrochromic material and a second transparent electroconductive electrode, barrier layers being inserted between the said electrodes and the said electrochromic material layers, the square resistance of the assembly formed by an electrode and its barrier layer being below 5 Ohms.

13 Claims, 1 Drawing Sheet

ELECTROCHROMIC GLAZING

FIELD OF THE INVENTION

The present invention relates to glazings or glass plates having electrocontrolled transmission or, in other words, electrochromic glazings, whose colouring state can be modified by the passage of an electric current. The invention more particularly applies to the checking of the sunlight supplied to buildings and the passenger compartments of motor vehicles.

BACKGROUND OF THE INVENTION

The electrochromic glazings according to the invention are glazings having a layer of a material able to reversibly insert cations, generally lithium ions or protons and whose oxidation states corresponding to the two inserted or deinserted states have different colouring states. In the case of tungsten trioxide, there is consequently a passage from a colourless oxide state into a reduced midnight blue colouring state, in accordance with the chemical reaction:

$$WO_3 + xM^+ + xe^- \rightleftharpoons M_xWO_3.$$

In order that the said reaction takes place, it is necessary to have alongside the electrochromic material layer a source of cations and a source of electrons, respectively constituted by a layer of an electrolyte having an ionic conductivity and an electroconducting layer serving as the electrode. To this first system incorporating a cathodic electrochromic material is added, by symmetry, a system with an anodic electrochromic material, such as iridium oxide, able to insert and deinsert cations in a reversible manner, the iridium oxide layer being inserted between the electrolyte layer and a second transparent electroconductive layer.

In European patent applications EP-A-253 713 and EP-A-338 876, the relationship existing between the size of an electrochromic system and the electric conductivity required for the electrode is shown. The switching times are increased unless the glazing has large dimensions and the transparent electroconductive layer has a low resistivity. For glazings larger than 200 cm, a square resistance below 5 Ohms is consequently recommended.

Such performance characteristics can certainly not be obtained with any type of thin layer, particularly as the other fundamental requirement is the transparent nature, a maximum light transmission being sought for the colour-removed state, which involves relatively small thicknesses in the case of numerous materials.

To this double requirement of high performance characteristics for the electrical conductivity and transparency is added in the case of glazings typically intended for use in cars and in particular sunroofs, the compatibility with a heat treatment of the glass sheet of the cambering and/or annealing type. This compatibility can be obtained with a camberable layer, i.e. able to withstand without deterioration a treatment at 600° C., or with a layer which can be deposited on a cold substrate, the reheating of the glass may lead to it losing its shape and the beneficial effects of the annealing process. Finally, the technology used must be adapted to the dimensions of the glazings and to industrial production, particularly from the cost and efficiency standpoints.

In the state of the art relative to electroconductive material layers, it would appear that the only suitable layers are those based on doped metallic oxides and more particularly layers of tin-doped indium oxide (ITO). Thus, the electrochromic systems proposed are typically stacks of glass/ITO/WO$_3$ (or some other cathodic electrochromic material)/electrolyte/Ir$_2$O$_3$ (or some other anodic electrochromic material)/ITO/glass.

However, in such systems, it has been found that there are problems linked with interactions between the electroconductive layers and the electrolyte or more precisely the cations which it supplies. Such a phenomenon can appear surprising to the extent that the transparent electroconductive layer is not directly in contact with the electrochromic material. Nevertheless, this intercalated layer can never completely fulfil a protective function, because it must offer a maximum number of reactive sites for the cations, i.e. with a distribution over the entire thickness of the electrochromic material layer, which implies a relatively porous layer, which will be penetrated by the cations and which can therefore reach the transparent electroconductive layer.

In the case of proton systems based on the reversible insertion of protons, the deterioration of the system would appear to be linked with the slow corrosion mechanism due to acid-base reactions, even if the electrolyte is chosen from among the non-corrosive types, such as e.g. a solid acid-organic polymer complex. However, a limitation will be made hereinafter to electrochromic systems not using liquid acid solutions, whose corrosive nature is prejudicial to all the layers of the system and in particular to the electrochromic material layers. It should be noted that proposals have been made to substitute these polymer materials by materials such as dielectrics, but the latter have to be deposited in extremely thin film form, because if not their own colouring becomes prejudicial and in particular leads to risks of short-circuits in the case of large systems. In any case, cations must be present in the system and these substitution materials lead to a reduction of their numbers.

In the case of systems based on the reversible insertion of lithium ions, this problem of acid/base reactions a priori does not exist, so that a longer life of the systems could be expected. However, an ageing of the electrodes formed from doped indium oxide has been observed, said electrodes gradually turning brown. Research carried out by various authors has revealed that this colouring is probably due to a cathodic electrochromism phenomenon of the indium oxide, but unlike in the case of "true" electrochromic materials, this phenomenon is not totally reversible, so that the colouring persists.

It should be noted that this corrosion phenomenon is relatively slow and that the system normally functions for a certain time. However, following a long period of use or a simulation thereof by accelerated ageing tests at high temperatures, there is a significant deterioration e.g. after 5 hours at 100° C. or a higher temperature. Therefore this corrosion is a handicap to the development of systems, particularly in the case of building applications where there is a ten-year guarantee problem and in car applications where the use temperatures are often very high.

The invention aims at a novel type of electrochromic glazing, which does not suffer from this deterioration phenomenon with respect to the electroconductive layers.

SUMMARY OF THE INVENTION

Figure 1:
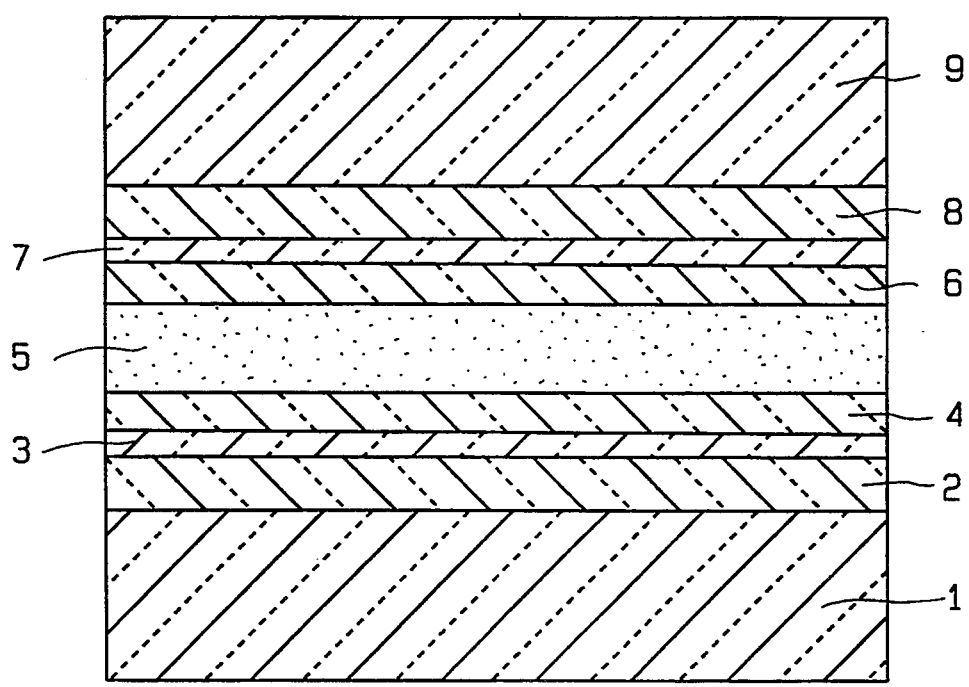
FIG. 1 is a cross sectional view of the electrochromic glazing of the invention.

According to a first constructional variant of the invention, this problem is solved by interposing a barrier layer between the electrochromic material layers and the electroconductive layers. Thus, a first object of the invention is an electrochromic glazing successively incorporating a glass sheet, a first electrode constituted by a transparent electroconductive layer, whose square resistance is below 5 Ohms, a barrier layer, a layer of a cathodic electrochromic material, an electrolyte, a layer of an anodic electrochromic material and a second barrier layer having a second transparent electroconductive electrode, the square resistance of the assembly formed by an electrode and its barrier layer being below 5 Ohms. The barrier layers (3,7) have a square resistance exceeding 20 ohms.

Thus, the barrier layer according to the invention is a component of the assembly forming the electrode and is unlike the system described by M. Stuart, F. Cogan and R. David Rauth in the article entitled "The a-$WO_3$-/$IrO_2$ electrochromic system", published by SPIE Institutes for advanced optical technologies (vol. IS4), in which it is recommended that at the interface of the electrolyte and electrochromic material that there should be a dielectric barrier layer, which amounts to surrounding the most corrosive electrolyte (the acid polymer) by another electrolyte. The barrier layer described in the above article cannot protect the transparent electrode against the action of protons because the latter must reach the electrochromic material layer to enable the electrochromism phenomenon to occur. However, being located to the rear of the electrochromic material layers, the barrier layer according to the invention can be "tight" to protons, or can at least be as tight as possible.

DETAILED DESCRIPTION OF THE INVENTION

A given layer can be used as the barrier layer according to the invention when there is a large ratio between its thickness and its porosity. In practice it is not desirable to excessively increase its thickness, because then the optical absorption linked with the barrier layer becomes prejudicial and there is a deterioration in the mechanical behaviour of the system with a greater propensity to delamination. It is therefore preferable to work with layers smaller than 600 nanometers. Moreover, it is advantageous to work under deposition conditions leading to high densities, i.e. in the sense of the invention relatively close to the theoretical density of the corresponding crystal lattice.

It would also appear desirable for the barrier layer to be made from a material other than indium oxide. Thus, it has been found that in particular in systems based on lithium insertion, that a densification of the indium oxide layer, throughout the entire thickness or only on the surface, is not a solution to the present problem, because even if a high density effectively limits the penetration of the lithium ions into the electrode, it does not make it possible to prevent all interactions at the surface of the electrode in contact with the electrochromic material layer and which once again leads to the appearance of a slight brown colouring and a reduction of the contrast.

Even if the barrier layer forms part of the electrode-forming assembly, it does not have to be very electroconductive. This point, which would appear to be relatively paradoxical in view of the qualities required for the electrodes, is due to the fact that the barrier layer is preferably deposited in thin film form, e.g. smaller than 600 nanometers and that in the thickness its insulating character will always be under conditions inadequate for effectively limiting the electronic conduction, provided that the electronic density to the rear of the barrier layer is an homogeneous as possible, which presupposes a very conductive, basic transparent electroconductive layer.

The barrier layer must be as stable as possible relative to electrolytes which, in the case of proton systems, requires a good resistance to acid etching. It has been stated hereinbefore that its thickness must be small, particularly so as not to prejudice the transparency of the electrode, but must still be adequate to obtain an adequate impermeability to cations.

It has been found that tin dioxide $SnO_2$, optionally slightly doped with antimony, deposited without any special precautions is particularly suitable for producing such barrier layers, thicknesses of 100 to 500 nanometers being satisfactory.

Very satisfactory results have also been obtained with a barrier layer formed from dense tungsten oxide with a density equal to or greater than 95% of the maximum theoretical density. It should be noted that such a tungsten oxide layer cannot have an electrochromism phenomenon, because the protons cannot reach the reactive sites.

According to another embodiment of the invention, the deterioration phenomenon of the electroconductive layers is avoided by choosing for them fluorine-doped tin oxide layers, deposited by vapour phase pyrolytic processes with thicknesses of approximately 800 to 900 nanometers.

Other advantageous features and details of the invention are given relative to the single drawing, which shows an electrochromic glazing according to the invention in a diagrammatic representation in which, for reasons of clarity, the question of proportionality of the different layers has been ignored.

The electrochromic system is constituted by a glass sheet 1 coated with a transparent electroconductive layer 2 forming the first electrode. The glass sheet 1 faces a second glass sheet, which is also coated by a transparent electroconductive layer 8. These two electrodes are connected to a not shown voltage generator. These electrodes are e.g. formed by tin-doped indium oxide layers deposited by magnetron cathodic sputtering in a thickness of 400 nm and have a square resistance of approximately 5 Ohms.

In the case of a proton system, the electrolyte can advantageously be formed by a solid solution of anhydrous phosphoric acid in polyethylene oxide prepared in the following way. Under strictly anhydrous conditions, dissolving takes place per liter of solvent of 20 g of standard purity phosphoric acid and 20 g of polyethylene oxide with a molecular weight of 5,000,000 (density 1.21, glass transition point $-40°$ C., O/H ratio of the number of oxygen atoms of the polymer to the number of hydrogen atoms of the acid 0.66). The solvent used is a 50:50 mixture of acetonitrile and tetrahydrofuran. The solution is poured onto a glass plate following the deposition of an electrochromic material layer (see hereinafter). The uniform thickness is obtained by the film drawing or pulling method. Pouring takes place under an atmosphere with a controlled moisture content. Following the evaporation of the solvent, a 50 micrometer film is obtained, whose conductivity at 20° C. is $2.10^{-5}$ Ohm$^{-1}$ cm$^{-1}$ and whose light transmission exceeds 85%. The moisture content at the time of pouring is preferably between 40 and 100 ppm, which subsequently makes it possible to obtain an optimum contrast.

In the case of a lithium system, the said electrolyte can be formed in a similar way by a lithium conducting polymer, particularly a polymer of the type disclosed in FR-A-2 642 890.

The electrolyte 5 is surrounded by two electrochromic material layers, a cathodic material, the tungsten oxide 4, deposited by magnetron cathodic sputtering over a thickness of 260 nm and an anodic material.

For proton systems, the chosen anodic electrochromic material is iridium oxide 6 deposited by magnetron cathodic sputtering (with a gaseous mixture of oxygen and hydrogen in a ratio of 80:20 in the case of deposition in accordance with EP-A-338 876), over a thickness of 55 nanometers.

For lithium systems, this anodic electrochromic material is nickel oxide 6 deposited by magnetron cathodic sputtering from a metal target with a gaseous mixture of oxygen and hydrogen in a ratio of 80:20 in the case of deposition according to EP-A-373 020 and over a thickness of 100 nanometers.

After assembly in the autoclave of the two aforementioned systems and without a barrier layer, following a few hours at 100° C., there is a reduction of the performance characteristics of the system, particularly due to an optical deterioration of the layers. In the proton system, it would appear that the tin-doped indium oxide layers dissolve in the polymer, which finally leads to a total loss of functionality of the system. In the lithium system, the tin-doped indium oxide layers turn brown and the colouring of the system becomes permanent.

If interposition now takes place between the electrodes 2 and 8 and the electrochromic material layers 4 and 6 of two barrier layers 5 and 7, constituted by tin oxide deposited by magnetron cathodic sputtering in a thickness of e.g. 300 nanometers, there is no longer any deterioration of the resistivity of the electrodes after 100 hours at 100° C., which indicates that the ITO electrodes have been completely protected.

We claim:

1. An electrochromic glazing comprising a glass sheet (1), a first transparent electroconductive electrode (2), a cathodic electrochromatic material layer (4), an electrolyte (5), an anodic electrochromatic material layer (6) and a second transparent electroconductive electrode (8), the first electrode (2) comprising a barrier layer (3) of tin oxide in contact with the cathodic electrochromic material layer (4), and the second electrode comprising a barrier layer (7) of tin oxide in contact with the anodic electrochromic material layer (6) and the second transparent electroconductive electrode (8), wherein the first and second electrodes each have a square resistance below about 5 Ohms.

2. Electrochromic glazing according to claim 1, characterized in that the said barrier layers (3, 7) have a square resistance exceeding about 20 Ohms.

3. Electrochromic glazing according to claim 1, characterized in that said barrier layers (3, 7) have a thickness below about 600 nanometers.

4. The electrochromatic glazing according to claim 1, characterized in that said barrier layers (3,7) each have a density close to the theoretical density of that layer's corresponding crystal lattice.

5. The glazing according to claim 1 wherein said first and second electrodes further comprise an indium tin oxide layer.

6. Electrochromic glazing according to claim 5, characterized in that the thickness of said barrier layer is between about 100 and 500 nanometers.

7. Glazing according to claim 1 wherein the first and second electrodes consist of fluorine doped tin oxide.

8. Glazing according to claim 1, characterized in that the electrolyte (5) is a protonic conductive electrolyte.

9. The glazing of claim 8 wherein said electrochromatic layer (6) has a thickness of about 100 nm.

10. Glazing according to claim 1, characterized in that the electrolyte (5) is a lithium conducting electrolyte.

11. The glazing of claim 10 wherein said electrochromatic layer (6) has a thickness of about 55 nm.

12. The glazing of claim 1 wherein said electroconductive layers have a thickness of about 800–900 nm.

13. An electrochromic glazing comprising a glass sheet (1),
   a first transparent electroconductive electrode (2),
   a cathodic electrochromatic material layer (4),
   an electrolyte (5) selected from the group consisting of protonic and lithium conducting,
   an anodic electrochromatic material layer (6) and a second transparent electroconductive electrode (8),
   the first electrode (2) comprising a barrier layer (3) of tin oxide in contact with the cathodic electrochromic material layer (4) and the second electrode comprising a barrier layer (7) of tin oxide in contact with the anodic electrochromic material layer (6),
   wherein said anodic electrochromic material layer is iridium oxide when said electrolyte is protonic,
   and said anodic electrochromic material layer is nickel oxide when said electrolyte is lithium conducting,
   wherein said first and second electrodes comprise an indium tin oxide layer.

* * * * *